July 14, 1953  F. W. JENSEN  2,645,563
METHOD OF DETERMINING THE END POINT OF A TITRATION
Filed Dec. 6, 1946  2 Sheets-Sheet 1

FREDERICK W JENSEN
INVENTOR.
BY Lester B. Clark
 & Ray L. Smith
ATTORNEYS

July 14, 1953  F. W. JENSEN  2,645,563
METHOD OF DETERMINING THE END POINT OF A TITRATION
Filed Dec. 6, 1946  2 Sheets-Sheet 2

FREDERICK W. JENSEN
INVENTOR.

BY Lester B. Clark
& Ray L. Smith
ATTORNEYS

Patented July 14, 1953

2,645,563

UNITED STATES PATENT OFFICE 2,645,563

METHOD OF DETERMINING THE END POINT OF A TITRATION

Frederick W. Jensen, College Station, Tex., assignor to Texas A. & M. Research Foundation, College Station, Tex., a private corporation Application December 6, 1946, Serial No. 714,618

6 Claims. (Cl. 23—230)

This invention relates to chemical analyses and more particularly to the determination of end-points in titrations and/or the determination of concentration of the components of a solution.

In certain types of chemical analysis by titration it has been proposed to introduce spaced electrodes in the solution undergoing titration and to make successive measurements of the conductivity of the solution. An abrupt change in such conductivity indicates that an end-point in the titration is reached and, a knowledge of the volume of the solution and the volume of the titrating reagent added to reach such point, provides desired analytical information. Such procedure has various disadvantages one of which arises from the fact that the electrodes are immersed in the solution whereby electrochemical contamination of a sample may occur. Contamination may also result from the lack of proper cleansing of the electrode after a preceding titration. Further, the necessary and repeated rebalancing of bridge systems common to such procedure is tedious and cumbersome.

It may also be noted that, because of differences between the conductances of the various ions and differences between the degrees of ionization of the various compounds involved in the titrations, some end-points are sharply indicated while others are relatively obscure.

The present invention is based upon the discovery that titration may be carried out in a high frequency electromagnetic field which operates to produce ionic motion and dipole rotation in a solution whereby there is an absorption of energy by the solution whether such solution be slightly ionized or highly ionized. Measurement of such absorption during titration is instrumental in providing a clear indication when an end-point is realized. The technique also obviates the use of electrodes and hence the source of contamination, to which reference has above been made, is eliminated.

The present invention comprehends, and it is an object of the invention, to provide a novel method of chemical analysis which obviates the difficulties heretofore experienced in conductivity methods of analysis.

Another object of the invention is to sensitively and with a high degree of accuracy, determine the end-point of a titration involving ions of either high or low conductances and/or compounds of either high or low degrees of ionization.

Still another object is to provide a method of analysis which enables simply and continuously observing the progress of a titration or analysis.

Another object of the invention is to place a solution in a high frequency electromagnetic field and to measure the energy absorbed thereby, whereby it is unnecessary to place electrodes in contact with the solution undergoing analysis.

A still further object of the invention is to determine the end-point of a titration by placing the solution within a high frequency electromagnetic field during titration and measuring the variations in energy input to effect ionic movement and/or dipole rotation in the solution as a titrating reagent is added thereto.

The invention also comprehends a method of determining, by reference to calibration data, the concentrations of components of a solution.

Another object is to provide a method of analysis which enables a continuous indication of variations in concentrations of components of a solution flowing in a fluid conducting system.

Another object of the invention is to place a solution in a high frequency electromagnetic field and to measure the energy absorbed thereby, whereby it is possible to follow the course of any chemical reaction, physical change, or both, taking place in the solution.

These and other objects and advantages of the invention will be more fully apparent from the following description, considered in connection with accompanying drawings, in which.

Various types of apparatus may be utilized when practicing the invention, the principal requirements being that the source 2 of high frequency electromagnetic field shall be relatively stable and sensitive and of adequate capacity and adjustability to enable measurements on a variety of solutions of which analyses are desired.

Figure 1:
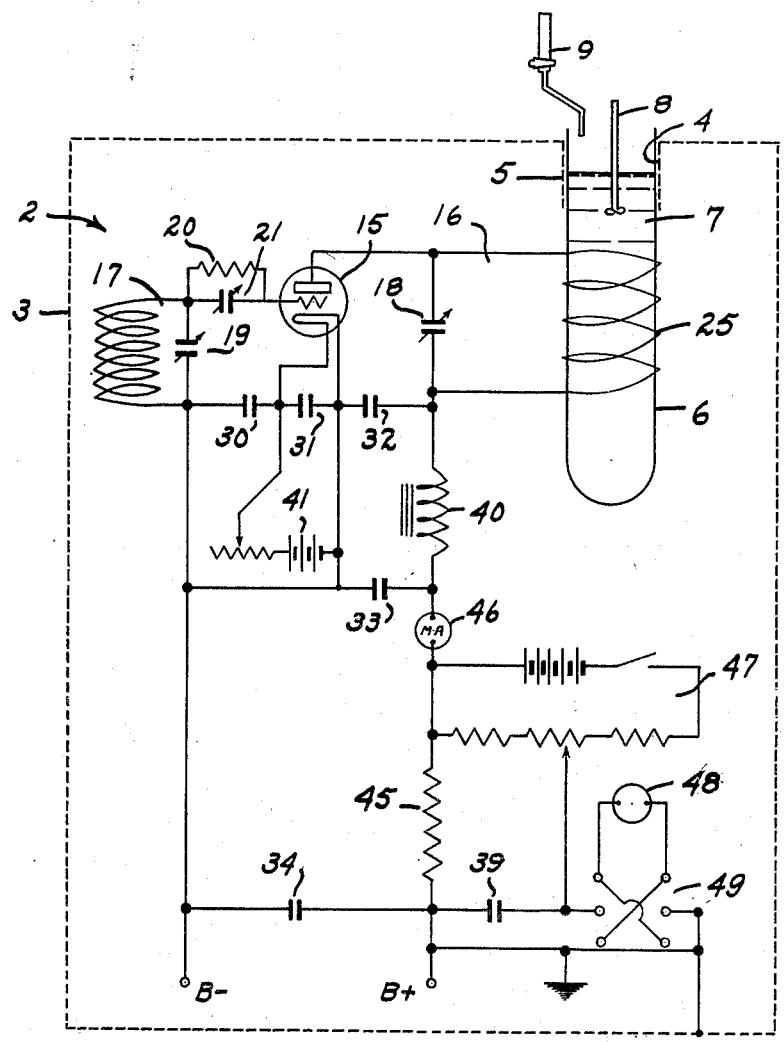
Fig. 1 is a circuit diagram of one form of high frequency apparatus for use in carrying out the method of the invention.

Preferably, the source of energy 2 is that shown schematically in Fig. 1, such source being encased within a shielding housing 3 provided with an opening 4 which is flanged inwardly at 5 and is adapted to receive a container 6 for the solution 7 undergoing analysis.

A stirrer 8 operated from a suitable source of energy (not shown) quickly establishes homogeneous conditions in the solution 7 after a quantity of reagent is introduced to the solution as by means of the burette 9. The flange 5 is instrumental in maintaining substantially uniform conditions of measurement as the volume of the solution increases from the addition of reagent in sufficient volume to reach the end-point.

The source 2 of high frequency oscillations comprises a tuned-plate, tuned-grid oscillator which includes a triode or three-element vacuum tube 15 having suitable characteristics, such as type 801. It is to be understood that, while this particular type of tube is mentioned specifically, the invention contemplates the use of any tube having required characteristics.

In the oscillator 2 the plate tank circuit 16 and the grid tank circuit 17 are preferably tuned to approximately the same frequency. The condenser 18 in the plate tank circuit 16 is a controlling factor in determining the frequency of oscillation, while the condenser 19 in the grid tank circuit 17 controls the excitation of the grid of the tube 15. Grid bias voltage is supplied by the flow of current through the resistance 20 while the trimmer condenser 21 by-passes high frequency energy around the resistance to the grid.

It is to be understood that any of various frequencies of oscillation of the high frequency source or oscillator 2 may be used to supply desired energy to the tank circuit coil or inductor 25 which is adapted to receive, in inductive relation, the container 6 within which the body of solution 7 is placed. Frequencies of the order of 15 to 20 megacycles are satisfactory although it is not intended that the invention shall be confined to the use of a frequency lying within this frequency range. At higher frequencies, sensitivities are greater, but these are offset, at least in part, by difficulties in properly shielding the device.

Since oscillators of the type herein disclosed are particularly sensitive to body capacity, preferably by-pass condensers shown at 30–39 inclusive are provided to minimize this difficulty. Such condensers together with choke coil 40 and the shielding housing 3 also assist in maintaining the advantage of sensitivity obtained when using higher frequencies as pointed out above.

Filament current for the tube 15 is provided by battery 41, and power for the oscillator comprises a suitable source of potential connected to terminals B— and B+. Current flowing in the power circuit is measured by the instrument 46, such as a milliammeter, and this instrument indicates when the oscillator is going into or out of oscillation.

The resistor 45 carries the current flowing in the power circuit and there is provided in parallel with this resistor a balancing system comprising potential divider 47 and sensitive instrument 48 which is reversibly connected through switch 49 into this system. It is intended that the potential divider 47 shall provide a potential adjustable to be equal and opposite to that existing across the resistor 45. This enables an initial balancing of the instrument 48 so that subsequent readings of this instrument are significant of the changes taking place as analysis progresses in accordance with the invention.

As already indicated, the instrument 46 indicates current flowing in the power circuit. Changes in this current during tuning may be observed and it is to be noted that proper tuning can produce marked changes in the power current when small changes are produced in the solution 7 during analysis thereof. In other words, high sensitivity of the system may be provided by proper tuning which, obviously, shall be so selected that continuous oscillation of the oscillator 2 shall be maintained. However, should the oscillator cease oscillating during an analysis, slight adjustment of the condenser 18 may be made to restore operating conditions without vitiating the analysis.

Attention is also directed to the fact that the flange 5 of the housing 3 should fit snugly around the container 6 so that there is a minimizing of the effect of loading of the oscillator 2 from the increase in volume of the solution 7 during a titration.

The manner of carrying out the invention by utilization of a source of high frequency energy, such as that above described, will now be explained by reference to specific examples. By way of reiteration it will first be pointed out that the oscillator 2 is first set in operation and adjusted to an optimum sensitivity for the analysis. A quantity of solution to be titrated is placed in the container 6 which may be of any suitable material, such as glass, plastic and the like, it being preferable that the container be of such nature that little energy will be imparted thereto from the high frequency field.

The container is placed within the opening 4 in the housing 3 and extends downwardly into the field produced by the coil 25. Preferably the container enters the coil so that the solution 7 is effectively subjected to the action of the electromagnetic field. The balancing circuit is next adjusted to give a convenient reading upon the meter 48.

A titrating reagent is then added to the solution at intervals through the burette 9. Intimate admixture of the solution and reagent is effected by the stirrer 8 and successive readings of the instrument 48 are had.

Figure 2:
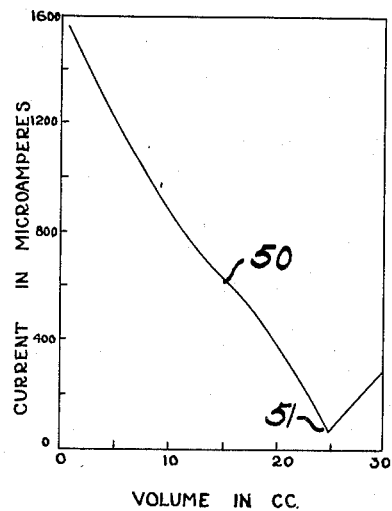
Fig. 2 is a curve obtained by using the invention when titrating hydrochloric acid with sodium hydroxide.
Figure 3:
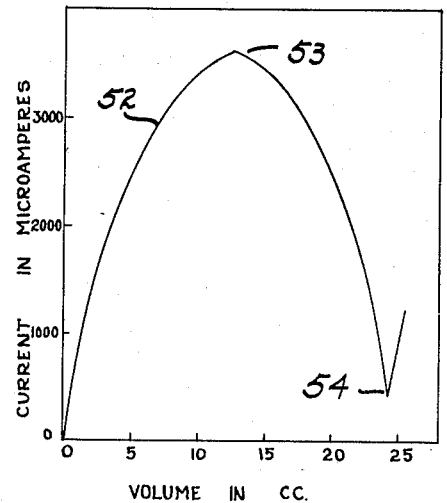
Fig. 3 is a similar curve obtained when titrating o-phthalic acid in acetone with sodium methylate in methanol.
Figure 4:
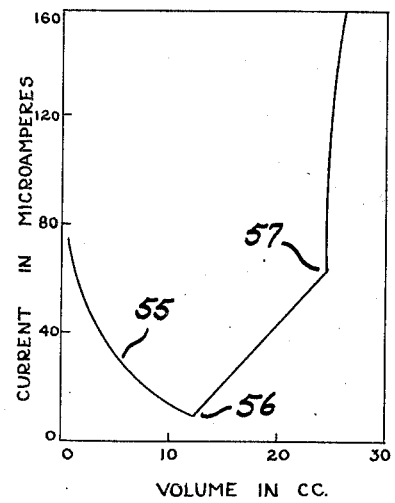
Fig. 4 shows results when titrating sodium carbonate with hydrochloric acid.

A variety of types of analyses are illustrated in Figs. 2, 3, and 4. In the titration represented in these figures, 25 cc. of the solution to be titrated of the order of tenth normal were diluted with 100 cc. of water. The titrating reagents used were also of the order of tenth normal. The negative slopes in the curves shown in these figures are produced when the disappearing ion has a greater conductance than the ion replacing it, or when dilution is the predominating factor. The positive slopes on the curves are produced when the disappearing ion has the lower conductance or when excess of titrating reagent enters the solution beyond the end-point. Thus, end-points appear as reversals or breaks in the slopes of the curves. In routine titrations and analyses the plotting of the titration curves is not always necessary, since the end-points can be observed on the meter 48, particularly if decided changes, or reversals in the slope of the curve are observed.

In Fig. 2, a plot of current versus volume of added reagent when titrating hydrochloric acid with sodium hydroxide, the end-point in the titration appears in curve 50 at 51 where there is a decided change in the slope of the curve.

In titrations in organic solvents or in mixtures of organic solvents, unique situations may arise, since ionic conductance is low and dipole conductance frequently constitutes a large part of the total conductance.

Fig. 3 shows the type curve obtained when o-phthalic acid in acetone is titrated with sodium methylate in methanol. The curve 52 has a reversal 53 representing one end-point and a reversal 54 in the curve at the second end-point.

Both end points of the titration of sodium carbonate with hydrochloric acid appear on the curve 55 of Fig. 4. The first end-point appears at 56 as a reversal in the curve and the second appears at 57 as a break in the slope of the curve.

It is also possible to determine the concentration of solutions by this method. Increases in loading of the oscillator due to increases in concentration in unionized solutions are much less than similar increases in ionized solutions. When hydrogen chloride is dissolved in dry benzene the ionization is inappreciable and any loading must be due to the rotation of the dipoles of the hydrogen chloride. The variations in loading of the oscillator under the above conditions are shown in curve 58 in Fig. 5. Also, by observing variations in loading over a period of time with a selected sample of solution within the high frequency field, information is had of chemical reaction and/or physical changes taking place within the solution during the period of observation.

When utilizing this technique in accordance with the invention, predetermined conditions are established in the oscillator and a suitable curve or series of curves are provided. When a sample of the solution to be analyzed is placed within the electromagnetic field of the coil 25, a reading will be observed upon the instrument 48. Such reading can be applied to the proper curve previously established, and the relative concentrations may then be directly read from the coordinates of the curve.

Figure 5:
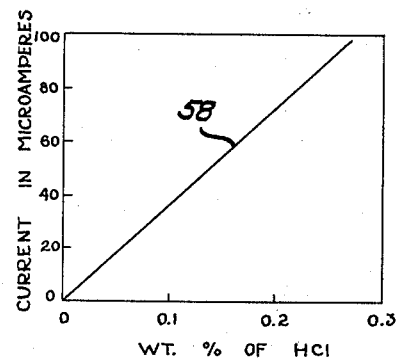
Fig. 5 illustrates the use of the invention in the determination of the concentrations of hydrogen chloride in benzene.
Figure 6:
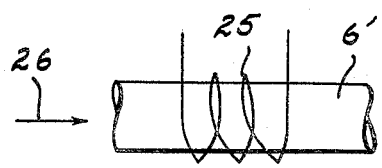
Fig. 6 is a diagrammatic illustration of the manner of using the invention for continuously determining the concentrations of components of a solution flowing in a fluid system.

Fig. 6 shows the application of the principle illustrated in Fig. 5 to a device for determining and/or controlling the concentration of solutions flowing through a pipe. The container 6 in Fig. 1 is replaced within the inductor 25, by the tube 6'. Again tube 6' is composed of any suitable material, it being preferable that the tube 6' be of such material that it absorbs little energy from the high frequency field of coil 25. The solution flows through the tube 6' as shown by the arrow 26. It is understood that the rest of the circuit shown in Fig. 1 remains substantially unchanged when applied to Fig. 6 except that it may be desirable that a suitable recording device and/or a suitable device for changing the concentration of the solution is used in conjunction with or in place of the metering device shown in Fig. 1. Any change in the concentration of the solution causes a change in the energy absorbed from the coil 25 which in turn is observed, recorded, and/or which is corrected by the device for changing the concentration of the solution.

It may be noted that a comparison of results, specifically given in the above illustrations, with results obtained by previously known methods of analysis shows a close correlation, however, improved results over those heretofore known are had by obviating the various difficulties previously experienced as hereinabove set forth.

Broadly the invention comprehends a method of titration and/or the determination of concentration of the components of a solution by use of a high frequency electromagnetic field, and the measurement of energy input to a sample of the solution undergoing observation.

The invention claimed is:

1. The method of determining the end-point of a titration when a solution is titrated against a reagent wherein one of said solution and said reagent is of known concentration while the other is of unknown concentration comprising the steps of, subjecting to a high frequency electromagnetic field a measured quantity of the solution, adding to such solution the reagent while such solution and the added reagent are maintained within said field, and continuously and instrumentally measuring with an electrical instrument the energy input to the resulting solution during such adding step to determine a point at which an abrupt reversal of the amount of current flowing in the measuring instrument is obtained as an indication that an end-point in the titration is reached measuring the amount of reagent added to the solution at said end-point, whereby the unknown concentration can be calculated.

2. The method of determining the end-point of a titration when a solution is titrated against a reagent wherein one of said solution and said reagent is of known concentration while the other is of unknown concentration comprising the steps of, subjecting to a high frequency electromagnetic field a measured quantity of the solution, adding to such solution the reagent while such solution and the added reagent are maintained with said field, stirring the solution and added reagent to produce and maintain a homogeneous body comprising the solution and reagent, and continuously and instrumentally measuring with an electrical instrument the energy input to the resulting solution during such adding step to determine a point at which an abrupt reversal of the amount of current flowing in the measuring instrument is obtained as an indication that an end-point in the titration is reached measuring the amount of reagent added to the solution at said end-point, whereby the unknown concentration can be calculated.

3. The method of determining the end-point of a titration when a solution is titrated against a reagent wherein one of said solution and said reagent is of known concentration while the other is of unknown concentration comprising the steps of, subjecting to a high frequency electromagnetic field a measured quantity of the solution, stirring the solution while adding thereto the titrating reagent while the solution and added reagent are maintained within said field, the addition of the titrating reagent being carried out at a rate that the resulting solution is maintained substantially homogeneous, and continuously and instrumentally measuring with an electrical instrument the energy input to the resulting solution during such adding step to determine a point at which an abrupt reversal of the amount of current flowing in the measuring instrument is obtained as an indication that an end-point in the titration is reached measuring the amount of reagent added to the solution at said end-point, whereby the unknown concentration can be calculated.

4. A method of titrating a solution with a reagent wherein one of said solution and said reagent is of known concentration and the other is of unknown concentration, comprising, surrounding a titrating vessel with an electrical coil in which current flows from an electrical circuit including an electronic oscillator, placing a quantity of solution in said titrating vessel, balancing out the current from said coil to a microammeter in the electrical circuit so that a predetermined reading of the microammeter is provided to enable the microammeter to thereafter measure substantially only the change in the current from said coil, adding a reagent to said solution in said titrating vessel to cause said change in current to determine a point in said adding at which the amount of current flowing in the microammeter makes an abrupt reversal, said point being the end-point of the titration reaction, and measuring the amount of reagent added to the solution at said end-point whereby the unknown concentration can be calculated.

5. A method of titrating a solution with a reagent wherein one of said solution and said reagent is of known concentration and the other is of unknown concentration, comprising, surrounding a titrating vessel with an electrical coil in which current flows from an electrical circuit including an electronic oscillator, placing a quantity of solution in said titrating vessel, balancing out the current from said coil to a microammeter in the electrical circuit so that a predetermined reading of the microammeter is provided to enable the microammeter to thereafter measure substantially only the change in the current from said coil, adding a reagent to said solution in said titrating vessel to cause said change in current to determine a point in said adding at which the amount of current flowing in the microammeter makes a marked change, said point being the end-point of the titration reaction, and measuring the amount of reagent added to the solution at said end-point whereby the unknown concentration can be calculated.

6. The method of determining the end-point of a titration when a solution is titrated against a reagent wherein one of said solution and said reagent is of known concentration while the other is of unknown concentration comprising the steps of, placing a measured quantity of the solution within a high frequency electromagnetic field, shielding a portion of the solution from the influence of the magnetic field so that the volume of solution subjected to the field is maintained constant, adding to the solution the reagent while the constant volume thereof is subjected to the high frequency field, and instrumentally measuring with an electrical instrument the variations in energy input to the volume of changing solution to determine a point at which an abrupt reversal of the amount of current flowing in the measuring instrument is obtained as an indication that an end-point in the titration is reached measuring the amount of reagent added to the solution at said end-point, whereby the unknown concentration can be calculated.

FREDERICK W. JENSEN.

References Cited in the file of this patent

UNITED STATES PATENTS

| Number | Name | Date |
|---|---|---|
| 1,610,971 | Ruben | Dec. 14, 1926 |
| 1,793,970 | Simon et al. | Feb. 24, 1931 |
| 1,898,432 | Edwards | Feb. 21, 1933 |
| 1,976,904 | Terman | Oct. 16, 1934 |
| 2,047,985 | Weir | July 21, 1936 |
| 2,395,425 | Osborne | Feb. 26, 1946 |